(12) United States Patent
Zhu et al.

(10) Patent No.: US 10,555,146 B2
(45) Date of Patent: Feb. 4, 2020

(54) APPLICATION MIGRATION METHOD IN A MOBILE EDGE SYSTEM, RELATED DEVICE, AND SYSTEM

(71) Applicant: HUAWEI TECHNOLOGIES CO., LTD., Shenzhen, Guangdong (CN)

(72) Inventors: Qianghua Zhu, Beijing (CN); Chunshan Xiong, Shenzhen (CN); Xiaoyan Shi, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/201,297

(22) Filed: Nov. 27, 2018

(65) Prior Publication Data

US 2019/0098474 A1 Mar. 28, 2019

Related U.S. Application Data

(63) Continuation of application No. PCT/CN2016/083787, filed on May 28, 2016.

(51) Int. Cl.
*H04W 4/50* (2018.01)
*H04W 16/18* (2009.01)

(52) U.S. Cl.
CPC ............ *H04W 4/50* (2018.02); *H04W 16/18* (2013.01)

(58) Field of Classification Search
None
See application file for complete search history.

(56) References Cited

U.S. PATENT DOCUMENTS

2013/0188598 A1 7/2013 Zakrzewski et al.
2015/0271109 A1 9/2015 Bullotta et al.
(Continued)

FOREIGN PATENT DOCUMENTS

CN 103109271 A 5/2013
CN 103430516 A 12/2013
CN 103918245 A 7/2014

OTHER PUBLICATIONS

"Mobile Edge Computing (MEC); Framework and Reference Architecture", Group Specification, European Telecommunications Standards Institute (ETSI), , vol. MEC 003, No. V1.1.1, Mar. 2016, XP014274003 (18 pages).
(Continued)

*Primary Examiner* — Erika A Washington
(74) *Attorney, Agent, or Firm* — Womble Bond Dickinson (US) LLP

(57) ABSTRACT

The present application discloses an application migration method in a mobile edge system, a related device, and a system. The method performed by a mobile edge orchestrator includes: obtaining a working index set of a to-be-migrated application on a first mobile edge server, where the working index set includes a migration index set including at least one migration index; determining a target migration solution of the to-be-migrated application based on the working index set and a preset correspondence, which is a correspondence between a migration index set and a migration solution; and sending a migration instruction to a mobile edge platform manager, where the migration instruction carries the target migration solution, and the migration instruction is used to instruct the mobile edge platform manager to migrate, based on the target migration solution, the to-be-migrated application from the first mobile edge server to a second mobile edge server.

17 Claims, 8 Drawing Sheets

(56) References Cited

U.S. PATENT DOCUMENTS

| | | | |
|---|---|---|---|
| 2015/0365819 A1* | 12/2015 | Zhu ................. | H04W 8/22 |
| | | | 455/418 |
| 2018/0341520 A1* | 11/2018 | Zhu ................. | H04L 29/06 |
| 2019/0045409 A1* | 2/2019 | Rasanen ........... | H04W 36/0016 |
| 2019/0053108 A1* | 2/2019 | Trang ............... | H04W 36/0033 |

OTHER PUBLICATIONS

"Mobile-Edge Computing (MEC);Technical Requirements;Draft ETSI GS MEC 002", ETSI Draft; Draft ETSI GS MEC 002, European Telecommunications Standards Institute (ETSI), vol. ISG-MEC, No. V0.4.2, Jul. 2015, XP014250312 (42 pages).
ZTE Corporation:"Mobile Edge Computing Mobility", ETSI Draft; MEC(16)000043R2, European Telecommunications Standards Institute (ETSI), Feb. 3, 2016, XP014267592 (2 pages).
International Search Report dated May 28, 2016 in corresponding International Patent Application No. PCT/CN2016/083787 (4 pages).
Extended European Search Report dated Mar. 27, 2019 in corresponding European Patent Application No. 16903389.1 (11 pages).
International Search Report, dated Dec. 29, 2016, in International Application No. PCT/CN2016/083787 (4 pages).

\* cited by examiner

APPLICATION MIGRATION METHOD IN A MOBILE EDGE SYSTEM, RELATED DEVICE, AND SYSTEM

CROSS-REFERENCE TO RELATED APPLICATIONS

This application is a continuation of International Application No. PCT/CN2016/083787, filed on May 28, 2016. The disclosure of the aforementioned application is hereby incorporated by reference in its entirety.

TECHNICAL FIELD

The present application relates to the field of mobile communications technologies, and specifically, to an application migration method in a mobile edge system, a related device, and a system.

BACKGROUND

Mobile edge computing (MEC) provides an information technology service environment and a cloud computing capability in a radio access network (RAN) close to user equipment (UE), thereby creating a highly distributed environment for deploying an application and a service, and storing and processing data. The MEC may further open real-time radio network information, and provide personalized and context-related service experience for the user equipment (for example, provide a video optimization service based on a user location and a scaling value (QoS Class Identifier, QCI)). In the prior art, a mobile edge system is constructed based on a MEC concept.

In an existing mobile edge system, a fixed migration solution (for example, an application-based migration solution, a platform-based migration solution, or a routing-based migration solution) is used for a to-be-migrated application, to migrate the application from a source mobile edge server to a target mobile edge server. If the migration solution is not suitable for the to-be-migrated application, in a process of migrating the to-be-migrated application, relatively long service interruption time or a relatively long delay may occur on user equipment served by the to-be-migrated application in the mobile edge system.

SUMMARY

Embodiments of the present application provide an application migration method in a mobile edge system, a related device, and a system, to select a proper migration solution for a to-be-migrated application, and migrate the to-be-migrated application based on the migration solution, thereby reducing service interruption duration or a delay of user equipment served by the to-be-migrated application in the mobile edge system.

A first aspect of the embodiments of the present application provides an application migration method, including:

obtaining, by a mobile edge orchestrator, a working index set of a to-be-migrated application on a first mobile edge server, where the working index set includes a migration index set, and the migration index set includes at least one migration index; determining, by the mobile edge orchestrator, a target migration solution of the to-be-migrated application based on the working index set of the to-be-migrated application and a preset correspondence, where the preset correspondence is a correspondence between a migration index set and a migration solution; and sending, by the mobile edge orchestrator, a migration instruction to a mobile edge platform manager, where the migration instruction carries the target migration solution, and the migration instruction is used to instruct the mobile edge platform manager to migrate, based on the target migration solution, the to-be-migrated application from the first mobile edge server to a second mobile edge server. In this way, a proper migration solution can be selected for the to-be-migrated application, and the to-be-migrated application is migrated based on the migration solution.

With reference to the first aspect of the embodiments of the present application, in a first possible implementation of the first aspect, the migration index set includes:

one or more of migration duration of the to-be-migrated application, service interruption duration of the to-be-migrated application, whether the to-be-migrated application supports service continuity, whether an Internet Protocol IP address of the to-be-migrated application changes, and migration bandwidth required by the to-be-migrated application.

With reference to the first aspect or the first possible implementation of the first aspect of the embodiments of the present application, in a second possible implementation of the first aspect, the preset correspondence includes N correspondences, and N is an integer greater than or equal to 1; and the determining, by the mobile edge orchestrator, a target migration solution of the to-be-migrated application based on the working index set of the to-be-migrated application and a preset correspondence includes:

if the migration index set in the working index set successfully matches a migration index set in the preset correspondence, determining, by the mobile edge orchestrator, a migration solution corresponding to the matched migration index set as the target migration solution.

With reference to the first aspect, or the first or the second possible implementation of the first aspect of the embodiments of the present application, in a third possible implementation of the first aspect, the working index set includes indication information used to indicate whether the to-be-migrated application supports migration; and after the mobile edge orchestrator obtains the working index set of the to-be-migrated application on the first mobile edge server, if the indication information indicates that the to-be-migrated application supports migration, the mobile edge orchestrator determines the target migration solution of the to-be-migrated application based on the working index set of the to-be-migrated application and the preset correspondence.

With reference to the second possible implementation of the first aspect of the embodiments of the present application, in a fourth possible implementation of the first aspect, the migration index further includes an importance level of the migration index; and the determining, by the mobile edge orchestrator, a target migration solution of the to-be-migrated application based on the working index set of the to-be-migrated application and a preset correspondence includes:

determining, by the mobile edge orchestrator, the target migration solution of the to-be-migrated application in descending order of importance levels and based on the working index set of the to-be-migrated application and the preset correspondence.

With reference to any one of the first aspect and the first to the fourth possible implementations of the first aspect of the embodiments of the present application, in a fifth possible implementation of the first aspect, the obtaining, by a mobile edge orchestrator, a working index set of a to-be-migrated application on a first mobile edge system includes:

obtaining, by the mobile edge orchestrator, the working index set of the to-be-migrated application from at least one of the following devices: user equipment UE, the mobile edge orchestrator, and a mobile network device in the mobile edge system in which the mobile edge orchestrator is located.

With reference to the fifth possible implementation of the first aspect of the embodiments of the present application, in a sixth possible implementation of the first aspect, the obtaining, by a mobile edge orchestrator, a working index set of a to-be-migrated application on a first mobile edge system includes:

learning, by the mobile edge orchestrator from the UE, whether the to-be-migrated application supports service continuity; and/or obtaining at least one of the following indexes from an application configuration file in the mobile edge orchestrator: the migration duration of the to-be-migrated application, the service interruption duration of the to-be-migrated application, and whether the to-be-migrated application supports service continuity; and/or obtaining at least one of the following indexes from the mobile network device: the migration bandwidth required by the to-be-migrated application, the migration duration of the to-be-migrated application, whether the to-be-migrated application supports service continuity, and whether the Internet Protocol IP address of the to-be-migrated application changes.

With reference to any one of the first aspect and the first to the sixth possible implementations of the first aspect of the embodiments of the present application, in a seventh possible implementation of the first aspect, after the mobile edge orchestrator determines the target migration solution of the to-be-migrated application based on the working index set of the to-be-migrated application and the preset correspondence, the mobile edge orchestrator determines a migration parameter based on the target migration solution.

With reference to the seventh possible implementation of the first aspect of the embodiments of the present application, in an eighth possible implementation of the first aspect, the migration instruction further carries the migration parameter.

A second aspect of the embodiments of the present application provides an application migration method, including:

receiving, by a mobile edge platform manager, a migration instruction sent by a mobile edge orchestrator, where the migration instruction carries a target migration solution of a to-be-migrated application on a first mobile edge server; and migrating, by the mobile edge platform manager, the to-be-migrated application from the first mobile edge server to a second mobile edge server based on the target migration solution. In this way, a proper migration solution can be selected for the to-be-migrated application, and the to-be-migrated application is migrated based on the migration solution.

With reference to the second aspect of the embodiments of the present application, in a first possible implementation of the second aspect, the migrating, by the mobile edge platform manager, the to-be-migrated application from the first mobile edge server to a second mobile edge server based on the target migration solution includes:

determining, by the mobile edge platform manager, a migration parameter based on the target migration solution; and migrating, by the mobile edge platform manager, the to-be-migrated application from the first mobile edge server to the second mobile edge server based on the target migration solution and the migration parameter.

A third aspect of the embodiments of the present application provides an application migration method, including:

receiving, by a mobile edge platform, a migration instruction sent by a mobile edge orchestrator by using a mobile edge platform manager, where the migration instruction carries a target migration solution of a to-be-migrated application on a first mobile edge server; and migrating, by the mobile edge platform, the to-be-migrated application from the first mobile edge server to a second mobile edge server based on the target migration solution. In this way, a proper migration solution can be selected for the to-be-migrated application, and the to-be-migrated application is migrated based on the migration solution.

With reference to the third aspect of the embodiments of the present application, in a first possible implementation of the third aspect, the migrating, by the mobile edge platform, the to-be-migrated application based on the target migration solution includes:

determining, by the mobile edge platform, a migration parameter based on the target migration solution; and migrating, by the mobile edge platform, the to-be-migrated application from the first mobile edge server to the second mobile edge server based on the target migration solution and the migration parameter.

A fourth aspect of the embodiments of the present application provides a mobile edge orchestrator, including units configured to perform the method in the first aspect.

A fifth aspect of the embodiments of the present application provides a mobile edge platform manager, including units configured to perform the method in the second aspect.

A sixth aspect of the embodiments of the present application provides a mobile edge platform, including units configured to perform the method in the third aspect.

A seventh aspect of the embodiments of the present application provides a mobile edge orchestrator, the mobile edge orchestrator includes a processor, and the processor is configured to support the mobile edge orchestrator in performing a corresponding function in the application migration method provided in the first aspect. The mobile edge orchestrator may further include a memory. The memory is configured to be coupled to the processor, and stores a program instruction and data that are necessary for the mobile edge orchestrator. The mobile edge orchestrator may further include a communications interface that is used by the mobile edge orchestrator to communicate with another device or communications network.

An eighth aspect of the embodiments of the present application provides a mobile edge platform manager, the mobile edge platform manager includes a processor, and the processor is configured to support the mobile edge platform manager in performing a corresponding function in the application migration method provided in the second aspect. The mobile edge platform manager may further include a memory. The memory is configured to be coupled to the processor, and stores a program instruction and data that are necessary for the mobile edge platform manager. The mobile edge platform manager may further include a communications interface that is used by the mobile edge platform manager to communicate with another device or communications network.

A ninth aspect of the embodiments of the present application provides a mobile edge platform, the mobile edge platform includes a processor, and the processor is configured to support the mobile edge platform in performing a corresponding function in the application migration method provided in the third aspect. The mobile edge platform may further include a memory. The memory is configured to be coupled to the processor, and stores a program instruction and data that are necessary for the mobile edge platform. The mobile edge platform may further include a communications interface that is used by the mobile edge platform to communicate with another device or communications network.

A tenth aspect of the embodiments of the present application provides a computer storage medium, configured to store a computer software instruction used by the mobile edge orchestrator provided in the seventh aspect, and the computer software instruction includes a program designed for performing the foregoing aspect.

An eleventh aspect of the embodiments of the present application provides a computer storage medium, configured to store a computer software instruction used by the mobile edge platform manager provided in the eighth aspect, and the computer software instruction includes a program designed for performing the foregoing aspect.

A twelfth aspect of the embodiments of the present application provides a computer storage medium, configured to store a computer software instruction used by the mobile edge platform provided in the ninth aspect, and the computer software instruction includes a program designed for performing the foregoing aspect.

A thirteenth aspect of the embodiments of the present application provides an application migration system, including the mobile edge server provided in the fourth aspect, and/or the mobile edge platform manager provided in the fifth aspect, and/or the mobile edge platform provided in the sixth aspect.

Solutions provided in the present application may be used to select a proper migration solution for a to-be-migrated application, and to migrate the to-be-migrated application based on the migration solution, so that service interruption duration or a delay of user equipment served by the to-be-migrated application in a mobile edge system can be reduced.

These aspects or other aspects of the present application are more concise and understandable in the description of the following embodiments.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

Figure 1:
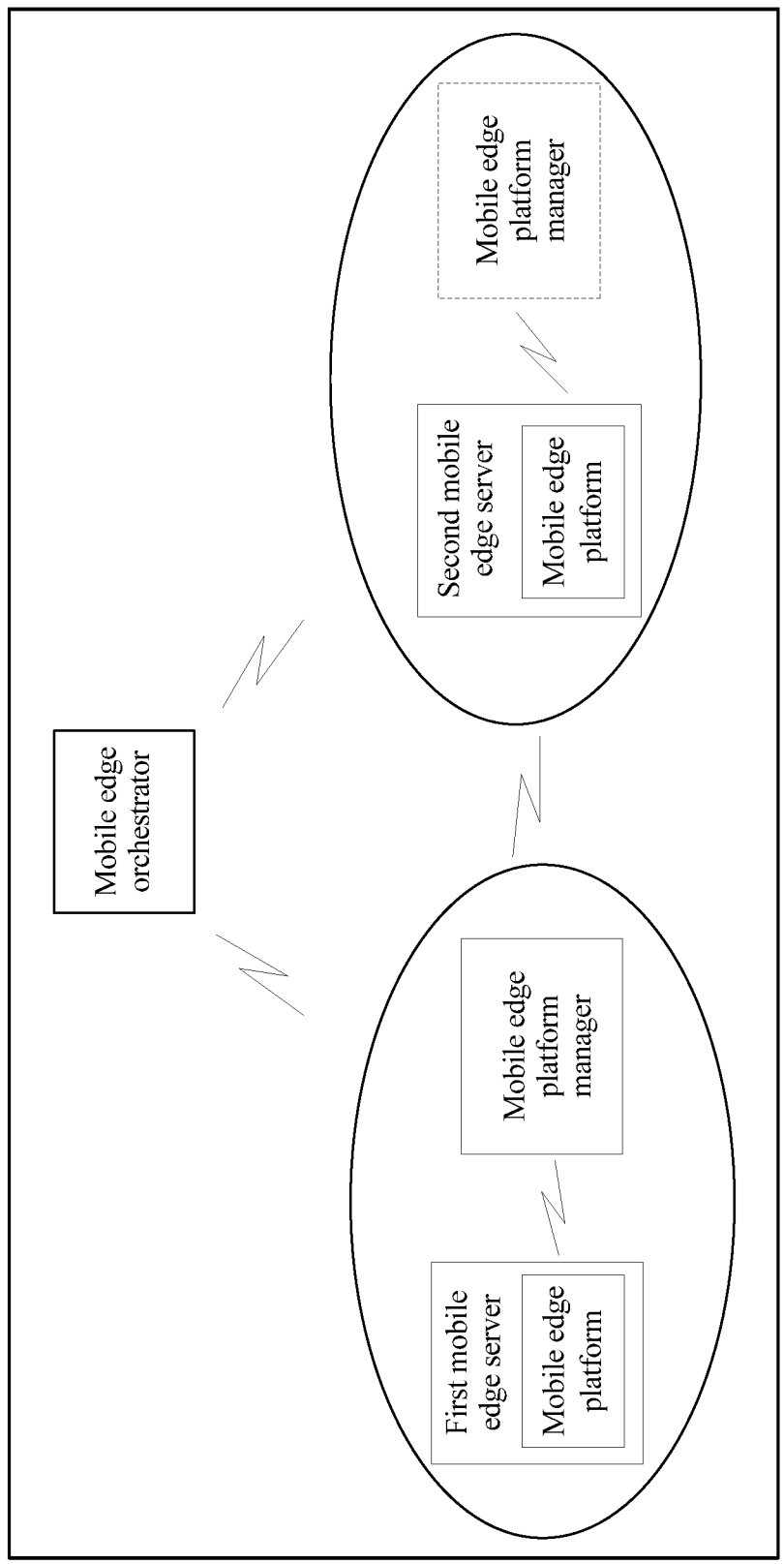
FIG. 1 is a network architectural diagram of an application migration system according to an embodiment of the present application.

Solutions provided in the present application may be used to select a proper migration solution for a to-be-migrated application, and to migrate the to-be-migrated application based on the migration solution, so that service interruption duration or a delay of user equipment served by the to-be-migrated application in a mobile edge system can be reduced.

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall in the protection scope of the present application.

In the specification, claims, and accompanying drawings of the present application, the terms "first", "second", "third", "fourth", and so on are intended to distinguish between different objects but do not indicate a particular order. Moreover, the terms "including", "comprising", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in the specification indicates that a particular characteristic, structure, or property that is related to the embodiment may be included in at least one embodiment of the present application. The phase occurred at different locations in the specification does not necessarily mean a same embodiment, or an independent or alternate embodiment exclusive of another embodiment. A person skilled in the art understands, in explicit and implicit manners, that an embodiment described in this application may be combined with another embodiment.

Some terms in this application are described below, to help a person skilled in the art have a better understanding.

(1) A mobile edge orchestrator is a logical function entity, and usually exists in a network management system of an operator. This is not limited in this application. A mobile edge platform manager is a logical function entity, and can be a physical entity independently deployed by a mobile network operator, for example, a capability exposure mobile platform or an intelligent push mobile platform deployed by the operator, and can also be a physical entity integrated into a mobile network, for example, may be a physical entity integrated into a packet data gateway. This is not limited in this application.

(2) User equipment includes a terminal, a mobile station (MS), a mobile terminal, or the like. The UE may communicate with one or more core networks by using a radio access network. For example, the UE may be a mobile phone (or referred to as a "cellular" phone) or a computer with a mobile terminal. For example, the UE may alternatively be a portable, pocket-sized, handheld, computer built-in, or in-vehicle mobile apparatus, which exchanges voice and/or data with the radio access network.

(3) A to-be-migrated application is an application in a mobile edge system, and the to-be-migrated application may include but is not limited to: virtual reality, augmented reality, an Internet of Vehicles application, mobile games, mobile office, video optimization, and the like. Generally, the to-be-migrated application may be an application on a first mobile edge server.

(4) A working index set of the to-be-migrated application includes at least a migration index set. The migration index set includes at least one migration index. The migration index may include but is not limited to: migration duration of the to-be-migrated application, service interruption duration of the to-be-migrated application, whether the to-be-migrated application supports service continuity, whether an Internet Protocol IP address of the to-be-migrated application changes, and migration bandwidth required by the to-be-migrated application. This is not limited herein. For example, the migration duration of the to-be-migrated application or the service interruption duration of the to-be-migrated application may be used as a selection basis for selecting a virtual machine—based migration solution or a container-based migration solution. Whether the to-be-migrated application supports service continuity may be used to indicate whether an IP address can change in a migration process. If the IP address changes, an IP changed—based migration solution (IP changed—based Solution) is selected. If the IP address does not change, an IP unchanged—based migration solution (IP unchanged—based Solution) is selected.

(5) The mobile edge orchestrator may obtain the working index set of the to-be-migrated application from at least one of the following devices, for example, the user equipment UE, the mobile edge orchestrator, and a mobile network device in the mobile edge system in which the mobile edge orchestrator is located. The mobile network device may include but is not limited to: a mobility management entity (MME), a service capability exposure function (SCEF) entity, and a home subscriber server (HSS).

Further, the mobile edge orchestrator may learn, from the UE, whether the to-be-migrated application supports service continuity; and/or may obtain at least one of the following indexes from an application configuration file in the mobile edge orchestrator: the migration duration of the to-be-migrated application, the service interruption duration of the to-be-migrated application, and whether the to-be-migrated application supports service continuity; and/or may obtain at least one of the following indexes from the mobile network device: the migration bandwidth required by the to-be-migrated application, the migration duration of the to-be-migrated application, whether the to-be-migrated application supports service continuity, and whether the Internet Protocol IP address of the to-be-migrated application changes.

(6) The to-be-migrated application may further include an application identifier corresponding to the to-be-migrated application. The application identifier is used to uniquely identify the to-be-migrated application. The application identifier may be an application name, a certificate, a sequence number, or the like. This is not limited in the embodiments of the present application.

(7) A migration solution of the to-be-migrated application may include but is not limited to: a platform-based migration solution, an application-based migration solution, and a routing-based migration solution. This is not limited in the embodiments of the present application. The platform-based migration solution means that a mobile edge platform in a source mobile edge server is responsible for transferring, in a real-time status, environment information, configuration information, and memory information of the to-be-migrated application to a target mobile edge server from the source mobile edge server. The environment information may include but is not limited to: a database of the to-be-migrated application, an agent configured for an operating system, a parameter of the operating system, an environment on which the to-be-migrated application depends, system compatibility, and the like. The configuration information may include but is not limited to: an attribute of the to-be-migrated application, a directory, a server, a user, an account, a maximum user capacity, an interface, and the like. The memory information is mainly memory required by the to-be-migrated application in a migration process. Further, based on different transmission memory information capacities of platform-based migration solutions, the migration solutions of the to-be-migrated application may be further subdivided into two types of migration solutions. A first migration solution is the virtual machine-based migration solution; to be specific, an overall status of a virtual machine in which the to-be-migrated application is located is saved. A second migration solution is the container-based migration solution; to be specific, a memory status of the virtual machine in which the to-be-migrated application is located is saved. The application-based migration solution means that it is necessary to set up, in the target mobile edge server, a mirror to-be-migrated application that has same environment information and configuration as the source mobile edge server, and the mirror to-be-migrated application is responsible for restoring the memory information in a process of migrating the to-be-migrated application. The routing-based migration solution means that when the to-be-migrated application does not meet a migration condition, the target mobile edge server needs to route user plane data of the UE to the source mobile edge server, and the to-be-migrated application in the source mobile edge server continues to provide service support for the UE. Further, based on an IP address changing status before and after migration, the migration solutions may be further subdivided into: the IP changed—based migration solution and the IP unchanged—based migration solution, and details are not described herein again.

(8) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The embodiments of this application are described below with reference to the accompanying drawings.

FIG. 1 is a network architectural diagram of an application migration system according to an embodiment of the present application. The application migration system in FIG. 1 includes: a mobile edge orchestrator, a first mobile edge server, a second mobile edge server, and a mobile edge platform manager on a side of the first mobile edge server. In this application, only an example in which the first mobile edge server is used as a source mobile edge server and the second mobile edge server is used as a target mobile edge server is used for description. Certainly, the second mobile edge server may alternatively be used as the source mobile edge server, and the first mobile edge server is used as the target mobile edge server. As a core element in the application migration system, the mobile edge orchestrator has a complete management function, to manage the application migration system. The first mobile edge server stores a plurality of applications. The plurality of applications include a to-be-migrated application, and further include a mobile edge platform. The mobile edge platform may manage the plurality of applications (including the to-be-migrated application) in the application migration system, and may provide data routing and routing path management functions in a process of migrating the to-be-migrated application. The mobile edge platform manager on the side of the first mobile edge server manages the mobile edge platform and the plurality of applications (including the to-be-migrated application).

Based on the network architectural diagram of the application migration system described in FIG. 1, the embodiments of the present application are described below in detail with reference to the accompanying drawings, to help a person skilled in the art have a better understanding.

Figure 2:
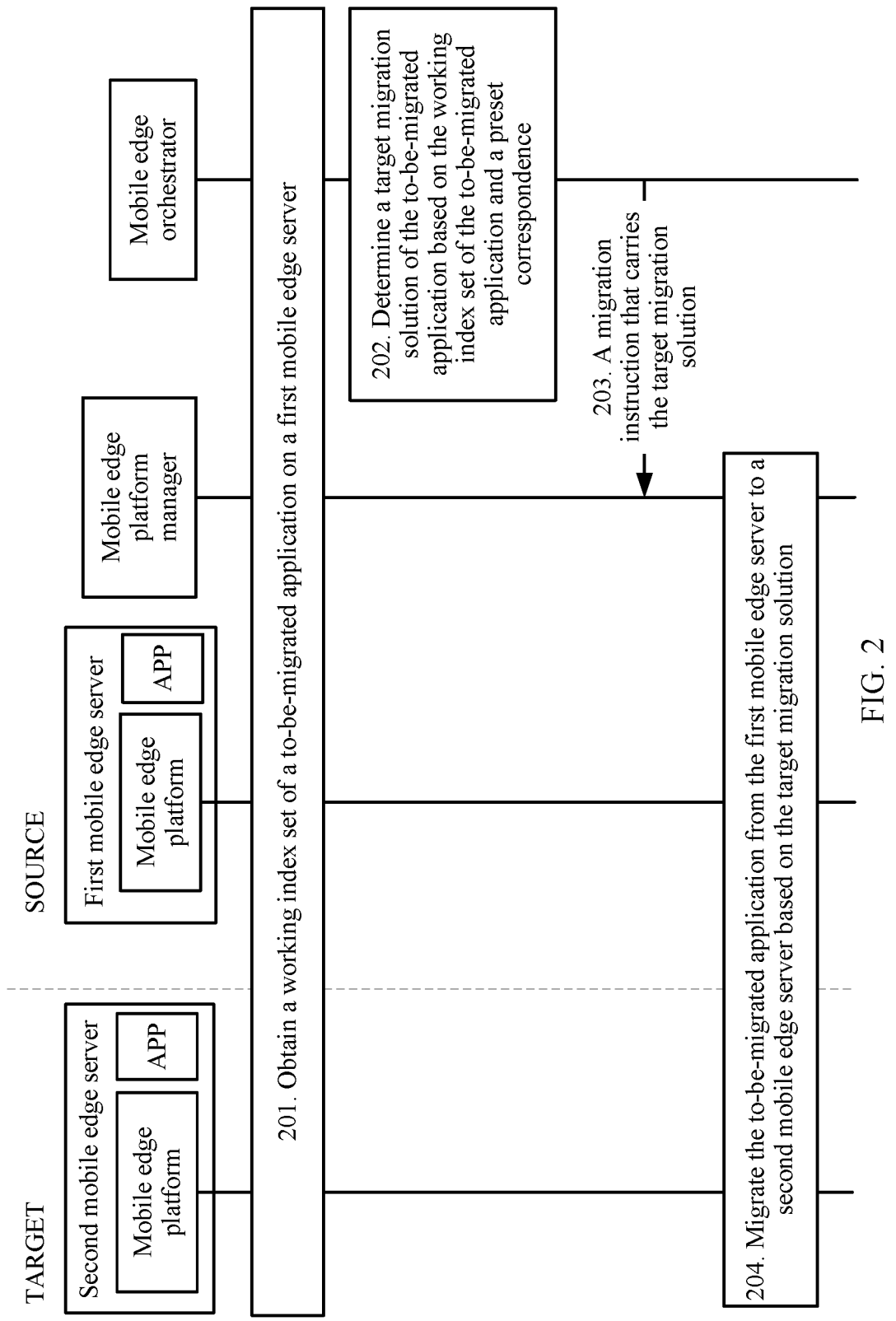
FIG. 2 is a flowchart of an application migration method according to an embodiment of the present application.

As shown in FIG. 2, an application migration method provided in an embodiment of the present application includes the following steps.

201. A mobile edge orchestrator obtains a working index set of a to-be-migrated application on a first mobile edge server, where the working index set includes a migration index set, and the migration index set includes at least one migration index.

202. The mobile edge orchestrator determines a target migration solution of the to-be-migrated application based on the working index set of the to-be-migrated application and a preset correspondence, where the preset correspondence is a correspondence between a migration index set and a migration solution.

203. The mobile edge orchestrator sends a migration instruction to a mobile edge platform manager, where the migration instruction carries the target migration solution.

204. The mobile edge platform manager migrates the to-be-migrated application from the first mobile edge server to a second mobile edge server based on the target migration solution.

In step 202, each migration index set corresponds to one migration solution. In other words, there is a preset correspondence between the migration index set and the migration solution. Specifically, a user may preselect different migration indexes to form a migration index set that a migration solution needs to meet.

Optionally, because a plurality of migration solutions may be selected for each to-be-migrated application, the preset correspondence may include N correspondences, and N is an integer greater than or equal to 1. In a process of performing step 202, if the migration index set in the working index set successfully matches a migration index set in the preset correspondence, a migration solution corresponding to the matched migration index set may be determined as the target migration solution.

Optionally, the working index set may include indication information used to indicate whether the to-be-migrated application supports migration. In this case, after step 201, if the indication information indicates that the to-be-migrated application supports migration, step 202 is performed.

Optionally, the migration index may further include an importance level of the migration index. In this case, in a process of performing step 202, the mobile edge orchestrator may determine the target migration solution of the to-be-migrated application in descending order of importance levels and based on the working index set of the to-be-migrated application and the preset correspondence. For example, it is assumed that the working index set includes a plurality of migration index sets, related migration indexes in the plurality of migration index sets include migration indexes A, B, C, and D, and a descending order of importance levels is A>B>C>D. In this way, in the process of performing step 202, it may be preferably determined whether a migration solution a that includes a migration index A meets a migration condition, in other words, it is determined whether the migration index A in the migration solution a matches the migration index A in the working index set. If it is determined that the migration index A in the migration solution a successfully matches the migration index A in the working index set, it is further determined, in descending order of importance levels, whether other migration indexes in the migration solution a match the migration index A in the working index set, and so on. If it is determined that the migration index A in the migration solution a does not match the migration index A in the working index set, the migration solution a may be excluded, and another migration solution that includes the migration index A is further selected to further determine whether the migration condition is met. If there is no other migration solution that includes the migration index A, a migration solution that includes a migration index B is selected to further determine whether the migration condition is met.

Optionally, after step 202, the mobile edge orchestrator may further determine a migration parameter based on the target migration solution. Further, the migration parameter and the target migration solution are encapsulated in the migration instruction. In this case, in a process of performing step 203, the migration instruction may be used to instruct the mobile edge platform manager to migrate, based on the migration parameter and the target migration solution, the to-be-migrated application from the first mobile edge server to the second mobile edge server.

For example, an application-based migration solution is used as an example. It is assumed that the migration index set of the to-be-migrated application is as follows: supporting service continuity, service interruption duration t1<50 ms, and migration duration t2<100 ms. If a working index found by the mobile edge orchestrator from an application configuration file of the mobile edge orchestrator includes service interruption duration t1<45 ms, a working index found from UE includes supporting service continuity, and a working index found from a mobile network device includes migration duration t2>110 ms. The working index set of the to-be-migrated application is: supporting service continuity, the service interruption duration t1<45 ms, and the migration duration t2>110 ms. There is no intersection between the migration duration in the working index set and the migration duration of the application-based migration solution. Therefore, the working index set does not match a migration index set corresponding to the application-based migration solution, and the to-be-migrated application cannot be migrated by using the application-based migration solution. However, another migration solution supported by the to-be-migrated application may be considered, for example, a routing-based migration solution or a platform-based migration solution. Alternatively, if a working index found by the mobile edge orchestrator from an application configuration file of the mobile edge orchestrator includes service interruption duration t1<45 ms, a working index found from UE includes supporting service continuity, and a working index found from a mobile network device includes migration duration t2<90 ms, the working index set of the to-be-migrated application is: supporting service continuity, the service interruption duration t1<45 ms, and the migration duration t2<90 ms. In this case, it is obvious that the working index set of the to-be-migrated application matches a migration index set corresponding to the application-based migration solution. Therefore, the application-based migration solution can be selected to migrate the to-be-migrated application.

It can be learned that, in this embodiment of the present application, the mobile edge orchestrator obtains the working index set of the to-be-migrated application on the first mobile edge server, where the working index set includes the migration index set, and the migration index set includes the at least one migration index; determines the target migration solution of the to-be-migrated application based on the working index set of the to-be-migrated application and the preset correspondence, where the preset correspondence is the correspondence between a migration index set and a migration solution; and sends the migration instruction to the mobile edge platform manager, where the migration instruction carries the target migration solution, and the migration instruction is used to instruct the mobile edge platform manager to migrate, based on the target migration solution, the to-be-migrated application from the first mobile edge server to the second mobile edge server. In this way, a proper migration solution can be selected for the to-be-migrated application, and the to-be-migrated application is migrated based on the migration solution, so that service interruption duration or a delay of the user equipment served by the to-be-migrated application in a mobile edge system can be reduced.

Figure 3:
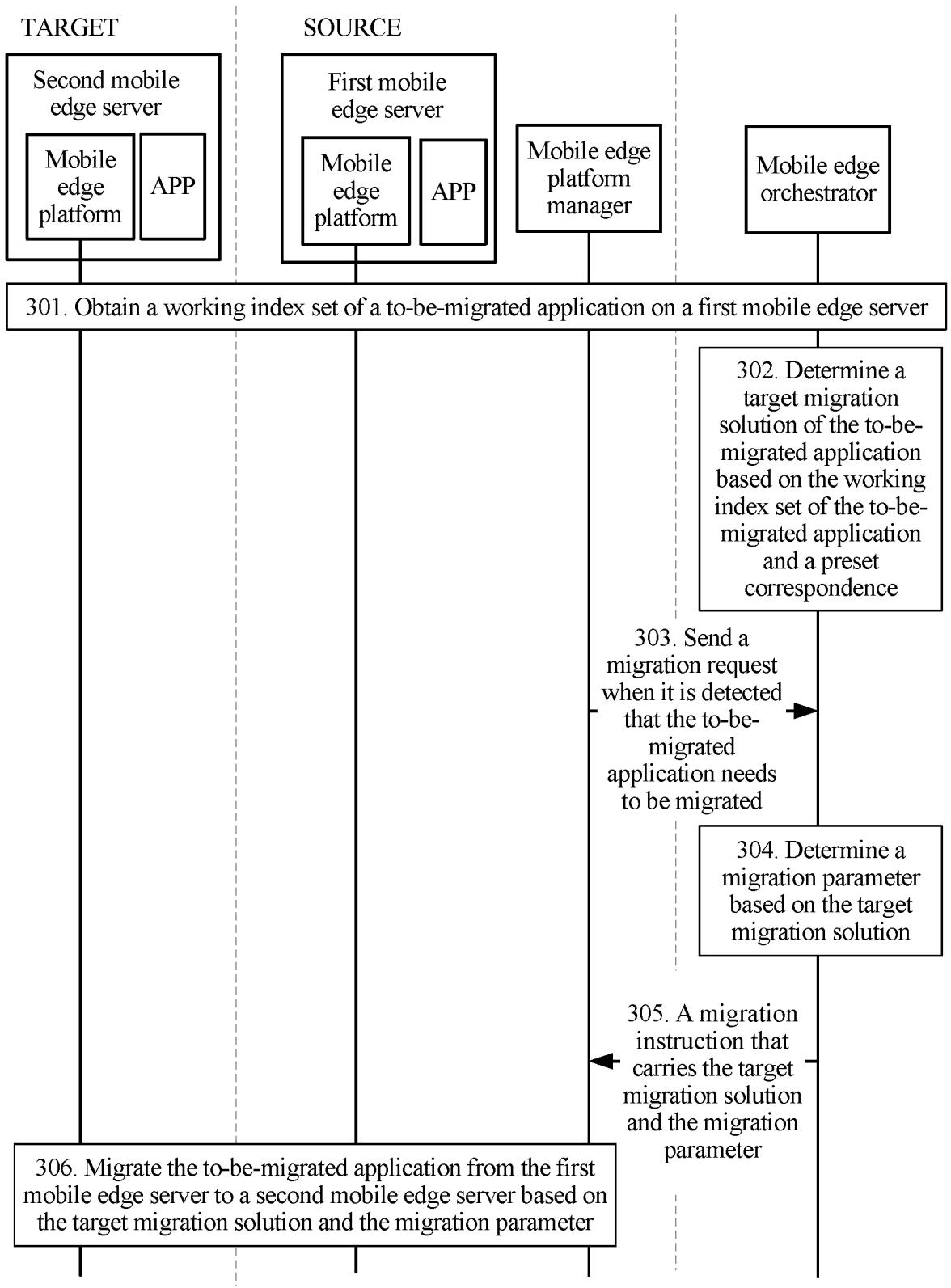
FIG. 3 is another flowchart of an application migration method based on FIG. 2 according to an embodiment of the present application.

For example, FIG. 3 is another flowchart of the application migration method shown in FIG. 2, and the method includes the following steps.

301. A mobile edge orchestrator obtains a working index set of a to-be-migrated application on a first mobile edge server, where the working index set includes a migration index set, and the migration index set includes at least one migration index.

302. The mobile edge orchestrator determines a target migration solution of the to-be-migrated application based on the working index set of the to-be-migrated application and a preset correspondence, where the preset correspondence is a correspondence between a migration index set and a migration solution.

303. A mobile edge platform manager sends a migration request to the mobile edge orchestrator when detecting that the to-be-migrated application needs to be migrated.

304. The mobile edge orchestrator determines a migration parameter based on the target migration solution.

305. The mobile edge orchestrator sends a migration instruction to the mobile edge platform manager, where the migration instruction carries the target migration solution and the migration parameter.

306. The mobile edge platform manager migrates the to-be-migrated application from the first mobile edge server to a second mobile edge server based on the target migration solution and the migration parameter.

After step 302 is performed, step 303 may be performed. To be specific, the mobile edge platform manager may determine, based on a detection report obtained in a load balancing process, whether the to-be-migrated application needs to be migrated; and if a detection result is that the to-be-migrated application needs to be migrated, the mobile edge platform manager may send the migration request to the mobile edge orchestrator; or if a detection result is that the to-be-migrated application does not need to be migrated, the mobile edge platform manager continues to perform step 303 until the detection result is that the to-be-migrated application needs to be migrated. The detection report is mainly a detection report received by the mobile edge platform manager from a virtual device manager. Main content of the detection report includes resource usage, for example, computing, storage, bandwidth, and a quantity of connections of the to-be-migrated application. If it is found that the first mobile edge server is in overload operation (to be specific, the entire first mobile edge server cannot meet an operating requirement of all applications), the to-be-migrated application needs to be migrated to another idle mobile edge server (namely, the second mobile edge server). In this case, the step that the mobile edge platform manager sends the migration request to the mobile edge orchestrator can be performed.

It can be learned that, a difference from the application migration method described in FIG. 2 lies in that, in the application migration method described in FIG. 3, the platform manager may detect whether the to-be-migrated application needs to be migrated and send the migration request to the mobile edge orchestrator only when the to-be-migrated application needs to be migrated.

Figure 4:
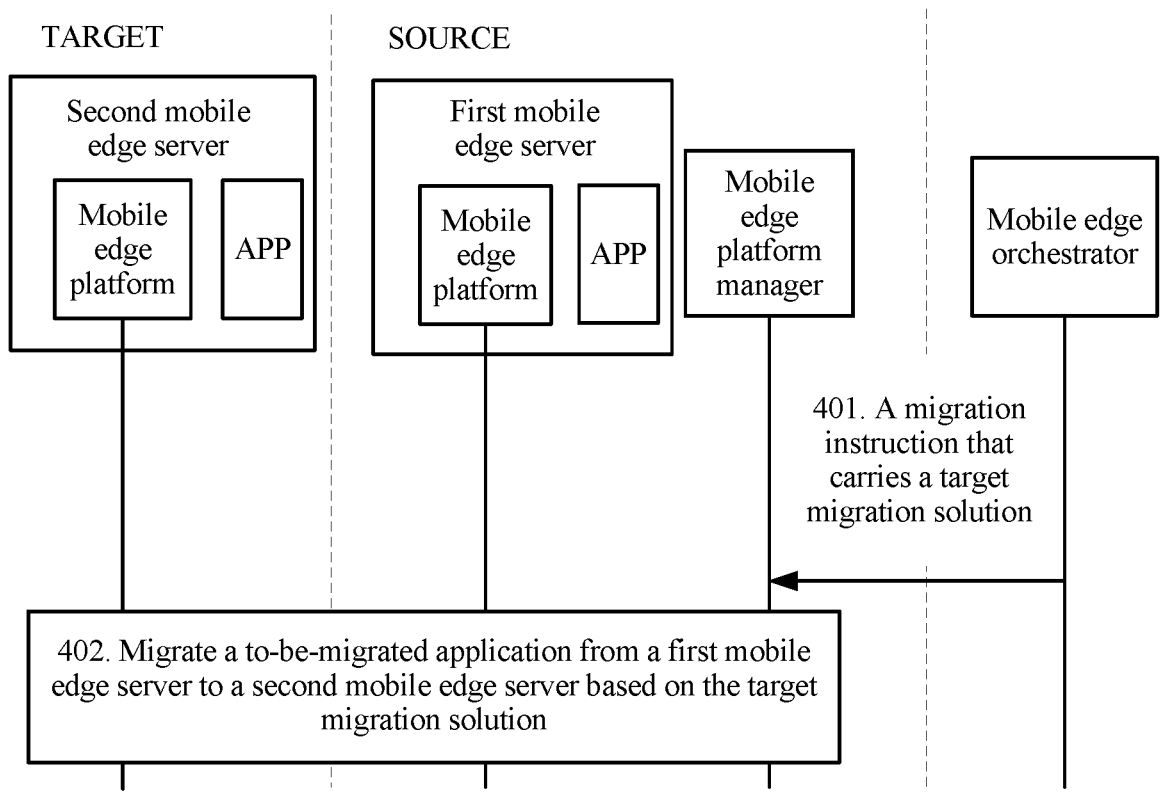
FIG. 4 is a flowchart of another application migration method according to an embodiment of the present application.

As shown in FIG. 4, another application migration method provided in an embodiment of the present application includes the following steps.

401. A mobile edge platform manager receives a migration instruction sent by a mobile edge orchestrator, where the migration instruction carries a target migration solution of a to-be-migrated application on a first mobile edge server.

402. The mobile edge platform manager migrates the to-be-migrated application from the first mobile edge server to a second mobile edge server based on the target migration solution.

Step 402 may further include the following steps.

(1) The mobile edge platform manager determines a migration parameter based on the target migration solution.

(2) The mobile edge platform manager migrates the to-be-migrated application from the first mobile edge server to the second mobile edge server based on the target migration solution and the migration parameter.

It can be learned that in this embodiment of the present application, the mobile edge platform manager receives the migration instruction sent by the mobile edge orchestrator, where the migration instruction carries the target migration solution of the to-be-migrated application on the first mobile edge server; and migrates the to-be-migrated application from the first mobile edge server to the second mobile edge server based on the target migration solution. In this way, a proper migration solution can be selected for the to-bemigrated application, and the to-be-migrated application is migrated based on the migration solution.

Figure 5:
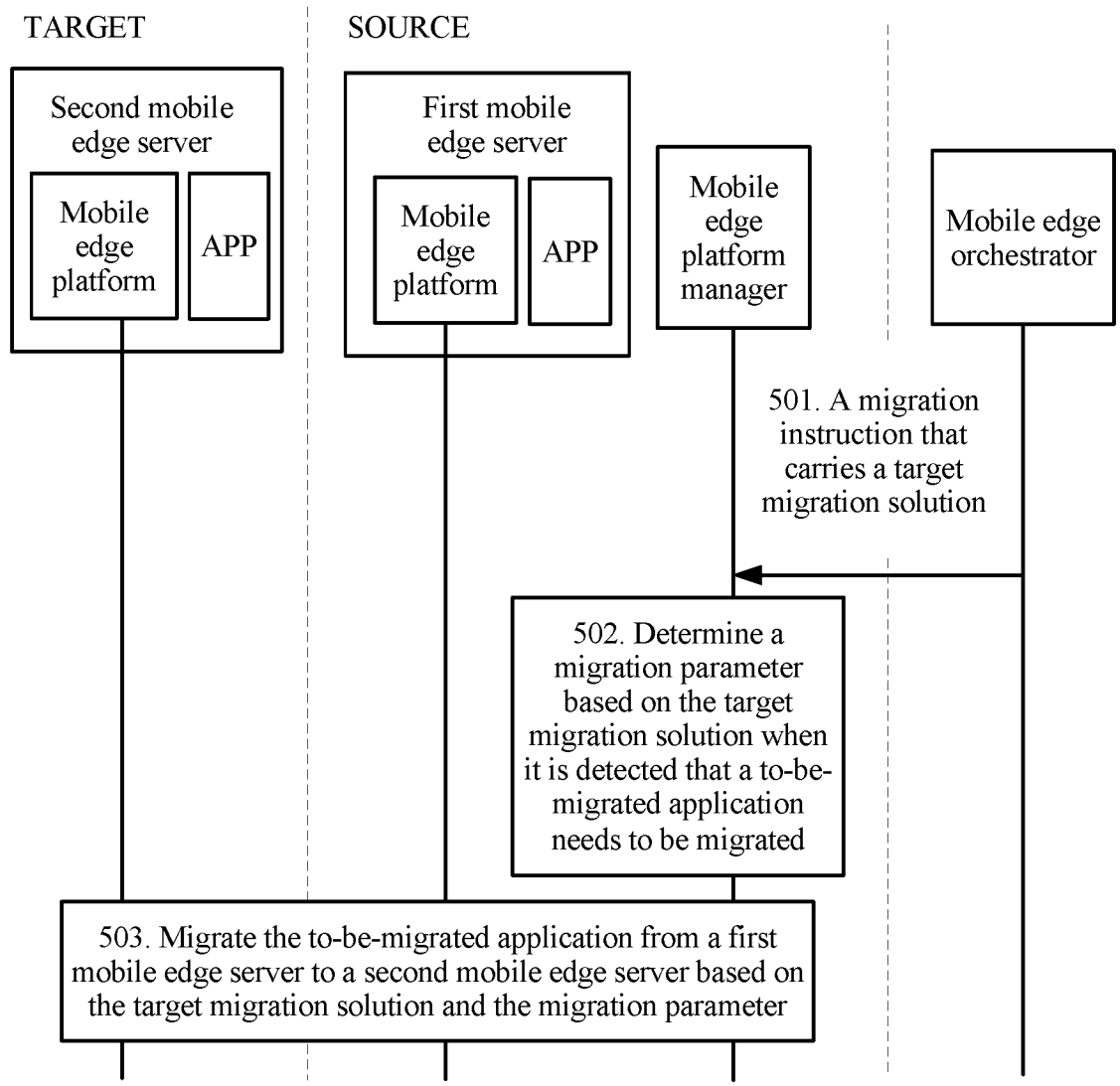
FIG. 5 is another flowchart of an application migration method based on FIG. 4 according to an embodiment of the present application.

For example, FIG. 5 is another flowchart of the application migration method shown in FIG. 4, and the method includes the following steps.

501. A mobile edge platform manager receives a migration instruction sent by a mobile edge orchestrator, where the migration instruction carries a target migration solution of a to-be-migrated application on a first mobile edge server.

502. When detecting that the to-be-migrated application needs to be migrated, the mobile edge platform manager determines a migration parameter based on the target migration solution.

503. The mobile edge platform manager migrates the to-be-migrated application from the first mobile edge server to a second mobile edge server based on the target migration solution and the migration parameter.

A difference from the application migration method described in FIG. 4 lies in that, in the application migration method described in FIG. 5, the platform manager may detect whether the to-be-migrated application needs to be migrated and determine, based on the target migration solution, the migration parameter only when the to-be-migrated application needs to be migrated.

Figure 6:
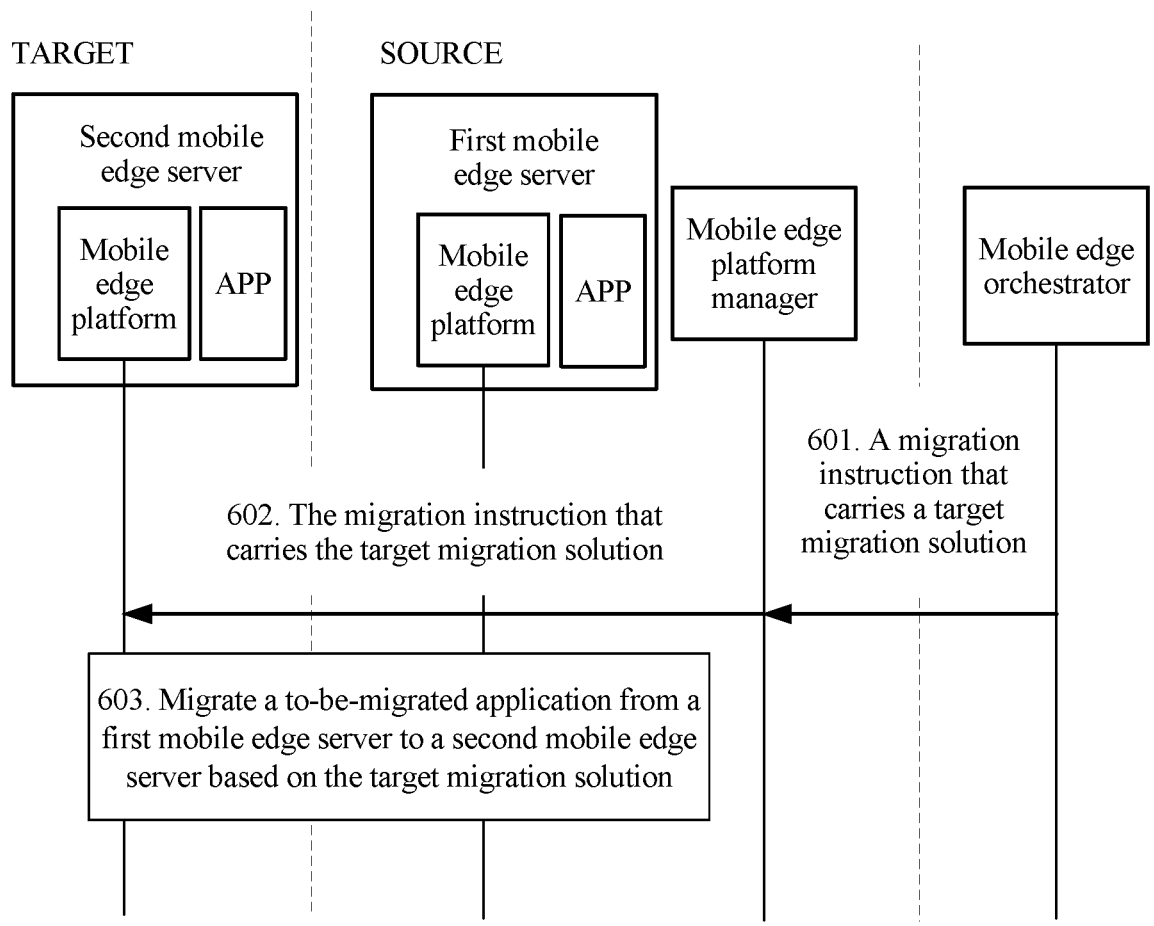
FIG. 6 is a flowchart of another application migration method according to an embodiment of the present application.

As shown in FIG. 6, another application migration method provided in an embodiment of the present application includes the following steps.

601. A mobile edge platform manager receives a migration instruction sent by a mobile edge orchestrator, where the migration instruction carries a target migration solution of a to-be-migrated application on a first mobile edge server.

602. A mobile edge platform receives the migration instruction sent by the mobile edge platform manager.

603. The mobile edge platform migrates the to-be-migrated application from the first mobile edge server to a second mobile edge server based on the target migration solution.

Optionally, in a process of performing step 603, the mobile edge platform may first determine a migration parameter based on the target migration solution, and then migrate the to-be-migrated application from the first mobile edge server to the second mobile edge server based on the target migration solution and the migration parameter.

Optionally, step 602 may further include the following steps.

(1) The mobile edge platform determines a migration parameter based on the target migration solution.

(2) The mobile edge platform migrates the to-be-migrated application from the first mobile edge server to the second mobile edge server based on the target migration solution and the migration parameter.

It can be learned that in this embodiment of the present application, the mobile edge platform receives the migration instruction sent by the mobile edge orchestrator by using the mobile edge platform manager, where the migration instruction carries the target migration solution of the to-be-migrated application on the first mobile edge server; and migrates the to-be-migrated application from the first mobile edge server to the second mobile edge server based on the target migration solution. In this way, a proper migration solution can be selected for the to-be-migrated application, and the to-be-migrated application is migrated based on the migration solution.

An apparatus for implementing the foregoing methods in the embodiments of the present application is described below with reference to the accompanying drawings.

Figure 7A:
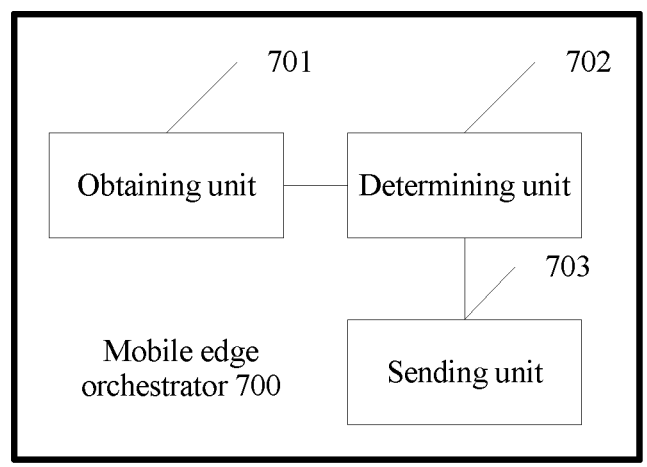
FIG. 7a is a schematic structural diagram of a mobile edge orchestrator according to an embodiment of the present application.

FIG. 7a is a schematic structural diagram of a mobile edge orchestrator according to an embodiment of the present application.

As shown in FIG. 7a, the mobile edge orchestrator 700 may include an obtaining unit 701, a determining unit 702, and a sending unit 703.

The obtaining unit 701 is configured to obtain a working index set of a to-be-migrated application on a first mobile edge server, where the working index set includes a migration index set, and the migration index set includes at least one migration index.

The determining unit 702 is configured to determine a target migration solution of the to-be-migrated application based on a preset correspondence and the working index set that is of the to-be-migrated application and that is obtained by the obtaining unit 701, where the preset correspondence is a correspondence between a migration index set and a migration solution.

The sending unit 703 is configured to send a migration instruction to a mobile edge platform manager, where the migration instruction carries the target migration solution determined by the determining unit 702, and the migration instruction is used to instruct the mobile edge platform manager to migrate, based on the target migration solution, the to-be-migrated application from the first mobile edge server to a second mobile edge server.

Optionally, the migration index set includes:

one or more of migration duration of the to-be-migrated application, service interruption duration of the to-be-migrated application, whether the to-be-migrated application supports service continuity, whether an Internet Protocol IP address of the to-be-migrated application changes, and migration bandwidth required by the to-be-migrated application.

Optionally, the preset correspondence includes N correspondences, and N is an integer greater than or equal to 1.

The determining unit 702 is specifically configured to:

if the migration index set in the working index set successfully matches a migration index set in the preset correspondence, determine a migration solution corresponding to the matched migration index set as the target migration solution.

Figure 7B:
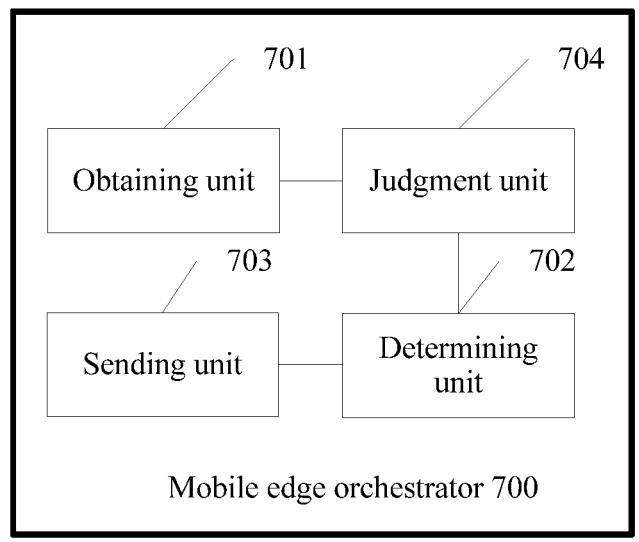
FIG. 7b is another schematic structural diagram of a mobile edge orchestrator according to an embodiment of the present application.

Optionally, as shown in FIG. 7b, the working index set in the mobile edge orchestrator described in FIG. 7a includes indication information used to indicate whether the to-be-migrated application supports migration, and the mobile edge orchestrator may further include:

a judgment unit 704, configured to: after the obtaining unit 701 obtains the working index set of the to-be-migrated application on the first mobile edge server, determine whether the indication information indicates that the to-be-migrated application supports migration, and if a determining result of the judgment unit 704 is that the indication information indicates that the to-be-migrated application supports migration, the determining unit 702 determines the target migration solution of the to-be-migrated application based on the preset correspondence and the working index set that is of the to-be-migrated application and that is obtained by the obtaining unit 701.

Further optionally, the migration index includes an importance level of the migration index, and the determining unit 702 is further specifically configured to:

determine the target migration solution of the to-be-migrated application in descending order of importance levels and based on the working index set of the to-be-migrated application and the preset correspondence.

Optionally, the obtaining unit 701 is specifically configured to:

obtain the working index set of the to-be-migrated application from at least one of the following devices: user equipment UE, the mobile edge orchestrator, and a mobile network device in a mobile edge system in which the mobile edge orchestrator is located.

Further optionally, the obtaining unit 701 is specifically configured to:

learn, from the UE, whether the to-be-migrated application supports service continuity; and/or obtain at least one of the following indexes from an application configuration file in the mobile edge orchestrator: the migration duration of the to-be-migrated application, the service interruption duration of the to-be-migrated application, and whether the to-be-migrated application supports service continuity; and/or obtain at least one of the following indexes from the mobile network device: the migration bandwidth required by the to-be-migrated application, the migration duration of the to-be-migrated application, whether the to-be-migrated application supports service continuity, and whether the Internet Protocol IP address of the to-be-migrated application changes.

Optionally, the determining unit 702 is further specifically configured to:

after the determining unit 702 determines the target migration solution of the to-be-migrated application based on the preset correspondence and the working index set that is of the to-be-migrated application and that is obtained by the obtaining unit 701, determine a migration parameter based on the target migration solution.

Further optionally, the migration instruction carries the migration parameter.

It should be noted that the foregoing units (the obtaining unit 701, the determining unit 702, the sending unit 703, and the judgment unit 704) are configured to perform related steps of the foregoing methods.

In this embodiment, the mobile edge orchestrator 700 is presented in a unit form. The "unit" herein may be an application-specific integrated circuit (application-specific integrated circuit, ASIC), a processor or a memory that executes one or more software or firmware programs, an integrated logic circuit, and/or another component that may provide the foregoing functions. In addition, the sending unit 703 may send information to the mobile edge platform manager by using a direct communications interface between and the mobile edge orchestrator and the mobile edge platform manager. The obtaining unit 701, the determining unit 702, and the judgment unit 704 may be implemented by using a processor and a memory in FIG. 10.

Figure 8:
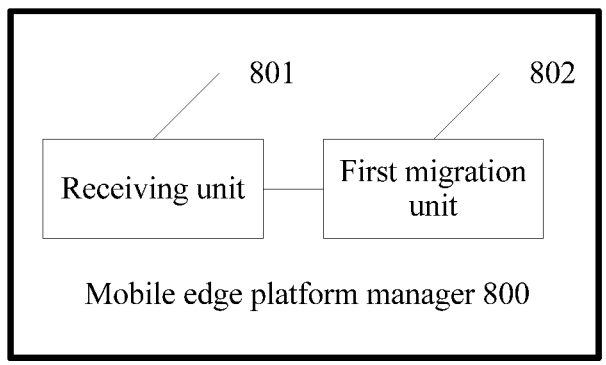
FIG. 8 is a schematic structural diagram of a mobile edge platform manager according to an embodiment of the present application.

FIG. 8 is a schematic structural diagram of a mobile edge platform manager according to an embodiment of the present application.

As shown in FIG. 8, the mobile edge platform manager 800 may include a receiving unit 801 and a first migration unit 802.

The receiving unit 801 is configured to receive a migration instruction sent by a mobile edge orchestrator, where the migration instruction carries a target migration solution of a to-be-migrated application on a first mobile edge server.

The first migration unit 802 is configured to migrate the to-be-migrated application from the first mobile edge server to a second mobile edge server based on the target migration solution received by the receiving unit 801.

Optionally, the first migration unit 802 includes:

a determining unit (not shown in the figure), configured to determine a migration parameter based on the target migration solution received by the receiving unit; and a second migration unit (not shown in the figure), configured to migrate the to-be-migrated application from the first mobile edge server to the second mobile edge server based on the target migration solution received by the receiving unit 801 and the migration parameter determined by the determining unit.

It should be noted that the foregoing units (the receiving unit 801 and the first migration unit 802) are configured to perform related steps of the foregoing methods.

In this embodiment, the mobile edge platform manager 800 is presented in a unit form. The "unit" herein may be a specific ASIC, a processor or a memory that executes one or more software or firmware programs, an integrated logic circuit, and/or another component that can provide the foregoing functions. In addition, the receiving unit 801 may receive, by using a direct communications interface between a mobile edge platform and the mobile edge platform manager, information sent by the mobile edge orchestrator by using the mobile edge platform manager. The first migration unit 802 may be implemented by using a processor and a memory in FIG. 10.

Figure 9:
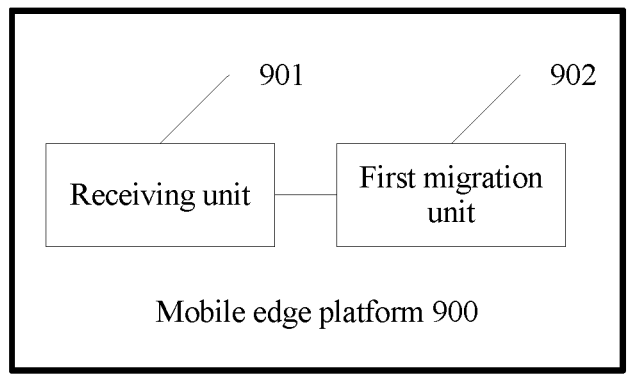
FIG. 9 is a schematic structural diagram of a mobile edge platform according to an embodiment of the present application.

FIG. 9 is a schematic structural diagram of a mobile edge platform according to an embodiment of the present application. This embodiment is described only by using the mobile edge platform as an example of a mobile edge platform in a first mobile edge server.

As shown in FIG. 9, the mobile edge platform 900 may include a receiving unit 901 and a first migration unit 902.

The receiving unit 901 is configured to receive a migration instruction sent by a mobile edge orchestrator by using a mobile edge platform manager, where the migration instruction carries a target migration solution of a to-be-migrated application on the first mobile edge server.

The first migration unit 902 is configured to migrate the to-be-migrated application from the first mobile edge server to a second mobile edge server based on the target migration solution received by the receiving unit 901.

Optionally, the first migration unit 902 includes:

a determining unit (not shown in the figure), configured to determine a migration parameter based on the target migration solution received by the receiving unit; and a second migration unit (not shown in the figure), configured to migrate the to-be-migrated application from the first mobile edge server to the second mobile edge server based on the target migration solution received by the receiving unit 901 and the migration parameter determined by the determining unit.

It should be noted that the foregoing units (the receiving unit 901 and the first migration unit 902) are configured to perform related steps of the foregoing methods.

In this embodiment, the mobile edge platform 900 is presented in a unit form. The "unit" herein may be a specific ASIC, a processor or a memory that executes one or more software or firmware programs, an integrated logic circuit, and/or another component that can provide the foregoing functions. In addition, the receiving unit 901 may receive, by using a direct communications interface between the mobile edge platform and the mobile edge platform manager, information sent by the mobile edge platform manager. The first migration unit 902 may be implemented by using a processor and a memory in FIG. 10.

Figure 10:
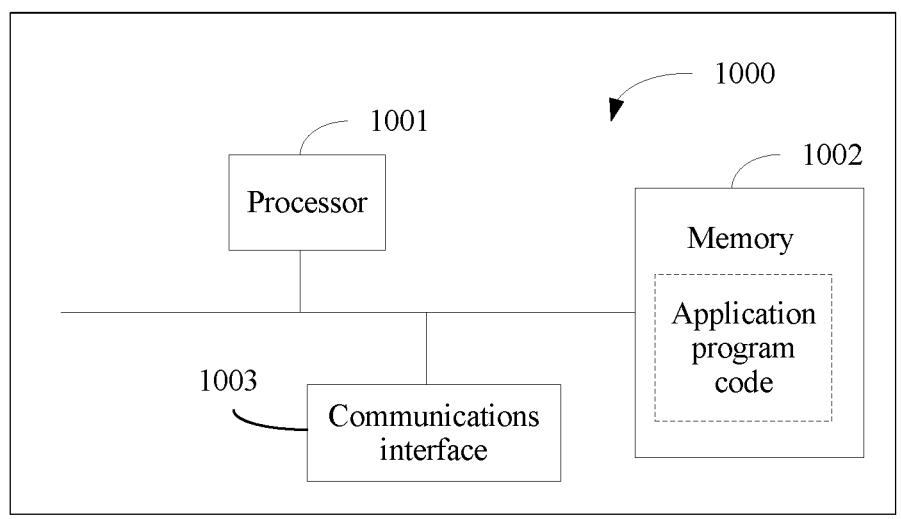
FIG. 10 is a schematic structural diagram of a device according to an embodiment of the present application.

As shown in FIG. 10, a mobile edge orchestrator 700, a mobile edge platform manager 800, and a mobile edge platform 900 may be implemented by using a structure in FIG. 10. A device 1000 includes at least one processor 1001, at least one memory 1002, and at least one communications interface 1003. In addition, the device may further include a general component such as an antenna, and details are not described herein again.

The processor 1001 may be a general-purpose central processing unit (CPU), a microprocessor, a specific ASIC, or one or more integrated circuits for controlling program execution in the foregoing solutions.

The communications interface 1003 is configured to communicate with another device or communications network, such as an Ethernet, a radio access network, or a wireless local area network (WLAN).

The memory 1002 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently, and is connected to the processor by using a bus. Alternatively, the memory may be integrated with the processor.

The memory 1002 is configured to store application program code used to execute the foregoing solutions, and the processor 1001 controls execution of the program code. The processor 1001 is configured to execute the application program code stored in the memory 1002.

When the device shown in FIG. 10 is a mobile edge orchestrator, the code stored in the memory 1002 may be used to perform the foregoing provided application migration method performed by the mobile edge orchestrator. For example, the mobile edge orchestrator obtains a working index set of a to-be-migrated application on a first mobile edge server, where the working index set includes a migration index set, and the migration index set includes at least one migration index; the mobile edge orchestrator determines a target migration solution of the to-be-migrated application based on the working index set of the to-be-migrated application and a preset correspondence, where the preset correspondence is a correspondence between a migration index set and a migration solution; and the mobile edge orchestrator sends a migration instruction to a mobile edge platform manager, where the migration instruction carries the target migration solution, and the migration instruction is used to instruct the mobile edge platform manager to migrate, based on the target migration solution, the to-be-migrated application from the first mobile edge server to a second mobile edge server. In this way, a proper migration solution can be selected for the to-be-migrated application, and the to-be-migrated application is migrated based on the migration solution.

When the device shown in FIG. 10 is a mobile edge platform manager, the code stored in the memory 1002 may be used to perform the foregoing provided application migration method performed by the mobile edge orchestrator. For example, the mobile edge platform manager receives a migration instruction sent by the mobile edge orchestrator, where the migration instruction carries a target migration solution of a to-be-migrated application on a first mobile edge server; and the mobile edge platform manager migrates the to-be-migrated application from the first mobile edge server to a second mobile edge server based on the target migration solution. In this way, a proper migration solution can be selected for the to-be-migrated application, and the to-be-migrated application is migrated based on the migration solution.

When the device shown in FIG. 10 is a mobile edge platform, the code stored in the memory 1002 may be used to perform the foregoing provided application migration method performed by the mobile edge orchestrator. For example, the mobile edge platform receives a migration instruction sent by the mobile edge orchestrator by using a mobile edge platform manager, where the migration instruction carries a target migration solution of a to-be-migrated application on a first mobile edge server; and the mobile edge platform migrates the to-be-migrated application from the first mobile edge server to a second mobile edge server based on the target migration solution. In this way, a proper migration solution can be selected for the to-be-migrated application, and the to-be-migrated application is migrated based on the migration solution.

The embodiments of the present application further provide a computer storage medium. The computer storage medium may store a program, and when the program is executed, some or all steps of any application migration method in the foregoing method embodiments may be performed.

Although the present application is described with reference to the embodiments, in a process of implementing the present application that claims protection, a person skilled in the art may understand and implement other variations of the disclosed embodiments by viewing the accompanying drawings, disclosed content, and the accompanying claims. In the claims, "comprising" (English: comprising) does not exclude another component or another step, and "a" or "one" does not exclude a plurality of A single processor or another unit may implement several functions enumerated in the claims. The fact that some measures are recited in mutually different dependent claims does not indicate that a combination of these measures cannot bring better effects.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product implemented on one or more computer-usable storage media (including but not limited to a disk memory, a CD-ROM, an optical memory, and the like) that include computer-usable program code. The computer program is stored/distributed in an appropriate medium, provided with other hardware or as a part of hardware, or may be distributed in another form such as in the Internet or in another wired or wireless telecommunication system.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, apparently, various modifications and combinations may be made to them without departing from the spirit and scope of the present application. Correspondingly, the specification and accompanying drawings are merely examples for description of the present application defined by the claims, and are intended to cover any of or all modifications, variations, combinations or equivalents within the scope of the present application. Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A mobile edge orchestrator, comprising a processor, a memory, and a communications interface, wherein the processor performs the following operations:
   obtaining a working index set of a to-be-migrated application on a first mobile edge server, wherein the working index set comprises a migration index set, and the migration index set comprises at least one migration index;
   determining a target migration solution of the to-be-migrated application based on the working index set of the to-be-migrated application and a preset correspondence, wherein the preset correspondence is a correspondence between a migration index set and a migration solution; and
   sending a migration instruction to a mobile edge platform manager, wherein the migration instruction carries the target migration solution, and the migration instruction is used to instruct the mobile edge platform manager to migrate, based on the target migration solution, the to-be-migrated application from the first mobile edge server to a second mobile edge server.

2. The mobile edge orchestrator according to claim 1, wherein the migration index set comprises: one or more of migration duration of the to-be-migrated application, service interruption duration of the to-be-migrated application, whether the to-be-migrated application supports service continuity, whether an Internet Protocol (IP) address of the to-be-migrated application changes, and migration bandwidth required by the to-be-migrated application.

3. The mobile edge orchestrator according to claim 1, wherein the preset correspondence comprises N correspondences, and N is an integer greater than or equal to 1; and
   the determining a target migration solution of the to-be-migrated application based on the working index set of the to-be-migrated application and a preset correspondence comprises:
   in response to the migration index set in the working index set successfully matches a migration index set in the preset correspondence, determining a migration solution corresponding to the matched migration index set as the target migration solution.

4. The mobile edge orchestrator according to claim 3, wherein the migration index further comprises an importance level of the migration index; and
   the determining a target migration solution of the to-be-migrated application based on the working index set of the to-be-migrated application and a preset correspondence comprises:
   determining the target migration solution of the to-be-migrated application in descending order of importance levels and based on the working index set of the to-be-migrated application and the preset correspondence.

5. The mobile edge orchestrator according to claim 1, wherein the working index set comprises indication information used to indicate whether the to-be-migrated application supports migration; and
   after obtaining the working index set of the to-be-migrated application on the first mobile edge server, the processor is further configured to:
   in response to the indication information indicates that the to-be-migrated application supports migration, determine the target migration solution of the to-be-migrated application based on the working index set of the to-be-migrated application and the preset correspondence.

6. The mobile edge orchestrator according to claim 1, wherein the obtaining a working index set of a to-be-migrated application on a first mobile edge system comprises:
   obtaining the working index set of the to-be-migrated application from at least one of the following devices: user equipment (UE), the mobile edge orchestrator, and a mobile network device in the mobile edge system in which the mobile edge orchestrator is located.

7. The mobile edge orchestrator according to claim 6, wherein the obtaining a working index set of a to-be-migrated application on a first mobile edge system comprises:
   learning, from the UE, whether the to-be-migrated application supports service continuity; and/or
   obtaining at least one of the following indexes from an application configuration file in the mobile edge orchestrator: the migration duration of the to-be-migrated application, the service interruption duration of the to-be-migrated application, and whether the to-be-migrated application supports service continuity; and/or obtaining at least one of the following indexes from the mobile network device: the migration bandwidth required by the to-be-migrated application, the migration duration of the to-be-migrated application, whether the to-be-migrated application supports service continuity, and whether the Internet Protocol (IP) address of the to-be-migrated application changes.

8. The mobile edge orchestrator according to claim 1, wherein after determining the target migration solution of the to-be-migrated application based on the working index set of the to-be-migrated application and the preset correspondence, the processor is further configured to:
   determine a migration parameter based on the target migration solution.

9. The mobile edge orchestrator according to claim 8, wherein the migration instruction further carries the migration parameter.

10. A mobile edge platform manager, comprising a processor, a memory, and a communications interface, wherein
   the processor performs the following operations:
   receiving a migration instruction from a mobile edge orchestrator, wherein the migration instruction carries a target migration solution of a to-be-migrated application on a first mobile edge server; and
   migrating the to-be-migrated application from the first mobile edge server to a second mobile edge server based on the target migration solution, wherein the target migration solution is determined based on a working index set of the to-be-migrated application and a preset correspondence between a migration index set a migration solution.

11. The mobile edge platform manager according to claim 10, wherein the migrating the to-be-migrated application from the first mobile edge server to a second mobile edge server based on the target migration solution comprises:
   determining a migration parameter based on the target migration solution; and
   migrating the to-be-migrated application from the first mobile edge server to the second mobile edge server based on the target migration solution and the migration parameter.

12. The mobile edge platform manager according to claim 10, wherein the migration index set comprises:
   one or more of migration duration of the to-be-migrated application, service interruption duration of the to-be-migrated application, whether the to-be-migrated application supports service continuity, whether an Internet Protocol (IP) address of the to-be-migrated application changes, and migration bandwidth required by the to-be-migrated application.

13. The mobile edge platform manager according to claim 10, wherein the preset correspondence comprises N correspondences, and N is an integer greater than or equal to 1; and
   the target migration solution of the to-be-migrated application corresponds to a matched migration index set, in response to the migration index set in the working index set successfully matching a migration index set in the preset correspondence.

14. A mobile edge platform, comprising a processor, a memory, and a communications interface, wherein
   the processor performs the following operations:
   receiving a migration instruction from a mobile edge orchestrator by using a mobile edge platform manager, wherein the migration instruction carries a target migration solution of a to-be-migrated application on a first mobile edge server; and
   migrating the to-be-migrated application from the first mobile edge server to a second mobile edge server based on the target migration solution, wherein the target migration solution is determined based on a working index set of the to-be-migrated application and a preset correspondence between a migration index set a migration solution.

15. The mobile edge platform according to claim 14, wherein the migrating the to-be-migrated application based on the target migration solution comprises:
   determining a migration parameter based on the target migration solution; and
   migrating the to-be-migrated application from the first mobile edge server to the second mobile edge server based on the target migration solution and the migration parameter.

16. The mobile edge platform accord to claim 14, wherein the migration index set comprises:
   one or more of migration duration of the to-be-migrated application, service interruption duration of the to-be-migrated application, whether the to-be-migrated application supports service continuity, whether an Internet Protocol (IP) address of the to-be-migrated application changes, the migration bandwidth required to the to-be-migrated application.

17. The mobile edge platform according to claim 14, wherein the preset correspondence comprises N correspondences, and N is an integer greater than or equal to 1; and
   the target migration solution of the to-be-migrated application corresponds to a matched migration index set, in response to the migration index set in the working index set successfully matching a migration index set in the preset correspondence.

* * * * *

UNITED STATES PATENT AND TRADEMARK OFFICE
CERTIFICATE OF CORRECTION

PATENT NO. : 10,555,146 B2
APPLICATION NO. : 16/201297
DATED : February 4, 2020
INVENTOR(S) : Qianghua Zhu, Chunshan Xiong and Xiaoyan Shi Page 1 of 1

It is certified that error appears in the above-identified patent and that said Letters Patent is hereby corrected as shown below:

In the Claims

In Claim 10, Column 21, Line 31-32, "a preset correspondence between a migration index set a migration solution." add the word "and" between the words "set" and "a"

In Claim 14, Column 22, Line 22-23, "a preset correspondence between a migration index set a migration solution." add the word "and" between the words "set" and "a"

In Claim 16, Column 22, Line 33, "The mobile edge platform accord to claim 14, wherein" replace the word "accord" with the word "according"

In Claim 16, Column 22, Line 41, "changes, the migration bandwidth required to the to-be-" delete the word "the" before the word "migration" and replace it with the word "and" also delete the word "to" after the word "required" and replace it with the word "by"

Signed and Sealed this
Twenty-second Day of December, 2020

Andrei Iancu
*Director of the United States Patent and Trademark Office*